C. B. WANAMAKER.
TENSION BRACKET FOR DRUMS.
APPLICATION FILED JULY 6, 1918.
1,334,334.
Patented Mar. 23, 1920.
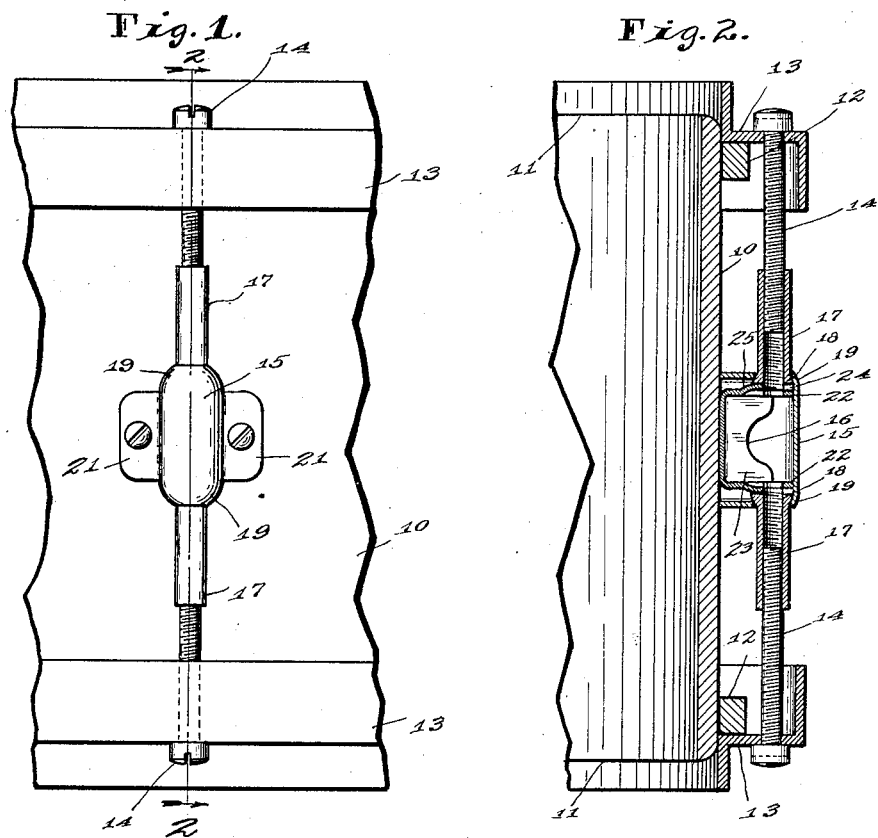
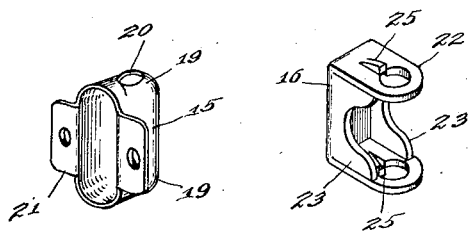
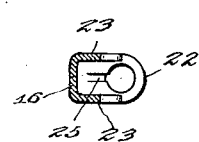
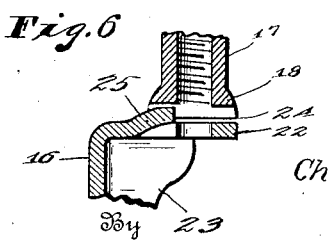
Witness
Frank A. Fahle
Inventor
Charles B. Wanamaker,
By Hood & Schley
Attorneys

UNITED STATES PATENT OFFICE.

CHARLES B. WANAMAKER, OF INDIANAPOLIS, INDIANA, ASSIGNOR TO LEEDY MANUFACTURING COMPANY, OF INDIANAPOLIS, INDIANA, A CORPORATION OF INDIANA.

TENSION-BRACKET FOR DRUMS.

1,334,334.  Specification of Letters Patent.  Patented Mar. 23, 1920.

Application filed July 6, 1918. Serial No. 243,625.

*To all whom it may concern:*

Be it known that I, CHARLES B. WANAMAKER, a citizen of the United States, residing at Indianapolis, in the county of Marion and State of Indiana, have invented a new and useful Tension-Bracket for Drums, of which the following is a specification.

It is the object of my invention to provide a tensioning device for drums whereby the drum heads may be tensioned separately and independently and the tension rods will be self-alining to allow for differences in positioning of the drum hoops so that they will always work freely without any lateral bending.

The accompanying drawing illustrates my invention.

Figure 1 is a fragmentary elevation of a drum, showing one tensioning means complete; Fig. 2 is a partial section on the line 2—2 of Fig. 1; Figs. 3 and 4 are perspective views of the bracket casing and of the stop member within such casing, respectively; Fig. 5 is a transverse central section through such stop member; and Fig. 6 is a fragmentary view showing the coöperation of the stop member with one of the screw sockets.

The drum shell 10, with the drum heads 11, their flesh hoops 12, and their counter-hoops 13, may be of any desired type, though as shown the counter-hoops 13 are of the double angle type overhanging the flesh hoops. Each counter-hoop 13 is provided with an annular series of suitable holes for receiving the headed tension screws 14, which are separate for the two hoops. The length of the tension screws 14 varies according to the length of the drum.

For each pair of opposite tension screws 14 extending from the two counter-hoops 13 there is a tension bracket. This bracket comprises an outer shell 15, an inner stop member 16, and two screw sockets 17. The two screw sockets 17 have ball segment heads 18 which are located within the shell 15 in sockets 19 formed in opposite ends of such shell, and the shanks of these screw sockets project outward through holes 20 in the sockets 19 to receive the two screws 14. The stop member 16 is completely inclosed in the shell 15, which latter is provided with ears 21 by which it may be attached to the drum shell 10. The base of the stop member 16 bears against the drum shell 10. From the base of this stop member there are up-turned ends 22 and up-turned sides 23, the latter lying between the two ends 22, so as to stiffen them, as is clear from Fig. 4. The ends 22 of the stop member lie loosely against the ball-segment heads 18 of the two screw sockets 17, and are preferably perforated in line with the holes through such screw sockets so as to permit the screws 14 to pass through if necessary or desirable. In order to hold the screw sockets 17 from turning, their heads 18 are provided with cross slots 24, and the ends 22 of the stop members are provided with offset fingers 25 which project loosely into such slots 24 when the parts are assembled, so as to prevent turning of the screw sockets. Each stop member 16 and each bracket shell 15 with its ears 21 and sockets 19 is made of a stamping from a single piece of metal.

In assembling the device, the two screw sockets are put in place in the shell 15, by being inserted from the inside so that their shanks extend through the holes 20 and their heads are received in the sockets 19. Then the stop member 16 is inserted in the shell 15 between the heads 18 of the two screw sockets, with the fingers 25 projecting into the slots 24. Then the assembled unit is fastened to the drum shell 10 by suitable screws extending through the ears 21. The necessary number of these units are applied to the drum shell at suitably spaced points around it. Then, the drum heads, flesh hoops, and counter-hoops having been put on in the usual way, the screws 14 are inserted through the counter-hoops 13 and into the screw sockets 17, and tightened up to give the desired tension of the drum heads. The tension of each drum head is adjusted separately, by manipulating the screws 14 associated with that drum head. The screw sockets 17, by reason of their ball-segment and socket mounting in the casing 15, have a limited universal movement and automatically swing into alinement with the screws 14 in case of any inaccuracy of manufacture, and more particularly in case of any misplacement of the counter-hoops relatively to the drum shell 10, as almost always happens. The parts do not fit together sufficiently tightly to prevent this swinging action, for the amount of movement necessary is slight. By reason of this self-alining feature of the screw sockets 17, the working of the screws 14 is always free and easy, without any tendency to bind by reason of lateral bending, and without any tendency to strip the threads. In manipulating the screws 14, the screw sockets 17 are kept from turning by the fingers 25 in the slots 24. Moreover, the stop member 16, by its location between the two heads 18 of the two screw sockets, serves effectively to withstand any undue thrusts which are put on the socket members 17 longitudinally thereof, as by excess pressure lengthwise of the screws 14 when tightening or loosening them.

I claim as my invention:

1. A tensioning device for drums, comprising a shell for attachment to the drum shell, said shell having sockets in its opposite ends, two oppositely projecting screw members projecting from said shell through said shell sockets and having heads coöperating with the shell sockets to permit universal movement of said screw members, and two screws coöperating with said two screw members and adapted to coöperate with the counter-hoops of the drum.

2. A tensioning device for drums, comprising a shell for attachment to the drum shell, said shell having sockets in its opposite ends, two oppositely projecting screw members projecting from said shell through said shell sockets and having heads coöperating with the shell sockets to permit universal movement of said screw members, two screws coöperating with said two screw members and adapted to coöperate with the counter-hoops of the drum, and a stop member mounted within said shell between the adjacent ends of said two screw members so as to take longitudinal thrusts therefrom.

3. A tensioning device for drums, comprising a shell for attachment to the drum shell, said shell having sockets in its opposite ends, two oppositely projecting screw members projecting from said shell through said shell sockets and having heads coöperating with the shell sockets to permit universal movement of said screw members, two screws coöperating with said two screw members and adapted to coöperate with the counter-hoops of the drum, and means for preventing said screw members from turning axially within said shell.

4. A tensioning device for drums, comprising a shell for attachment to the drum shell, said shell having sockets in its opposite ends, two oppositely projecting screw members projecting from said shell through said shell sockets and having heads coöperating with the shell sockets to permit universal movement of said screw members, two screws coöperating with said two screw members and adapted to coöperate with the counter-hoops of the drum, the adjacent ends of said screw members being slotted, and a stop member mounted in said shell between said two screw members and having fingers projecting into the slots in the ends of said screw members to prevent turning of the latter.

5. A tensioning device for drums, comprising a shell for attachment to the drum shell, said shell having sockets in its opposite ends, two oppositely projecting screw sockets projecting from said shell through said shell sockets and having heads coöperating with the shell sockets to permit universal movement of said screw members, two screws coöperating with said two screw sockets and adapted to coöperate with the counter-hoops of the drum, the adjacent ends of said screw sockets being slotted, and a stop member mounted in said shell between said two screw sockets and having fingers projecting into the slots in the ends of said screw sockets to prevent turning of the latter, said stop member being perforated in alinement with the holes through said screw sockets so as to permit the screws to pass through.

In witness whereof I have hereunto set my hand at Indianapolis, Indiana, this twenty-eighth day of June, A. D. one thousand nine hundred and eighteen.

CHAS. B. WANAMAKER.